Jan. 21, 1941.  J. B. GAFFNEY  2,229,447
CLINKER COOLER
Filed May 4, 1940  2 Sheets-Sheet 1
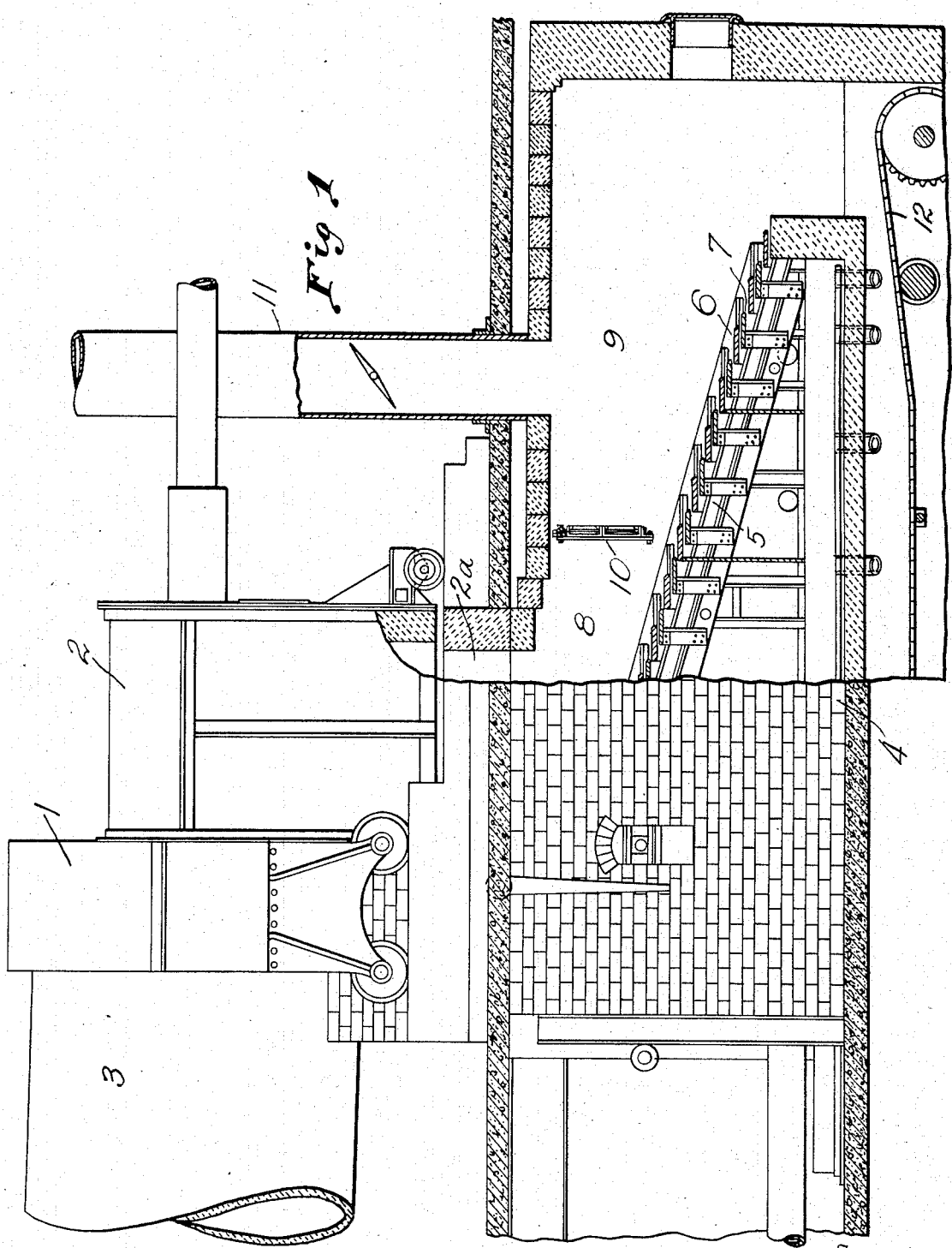
Inventor
JOSEPH B GAFFNEY
By Pennie Davis Marvin Edmonds
Attorneys

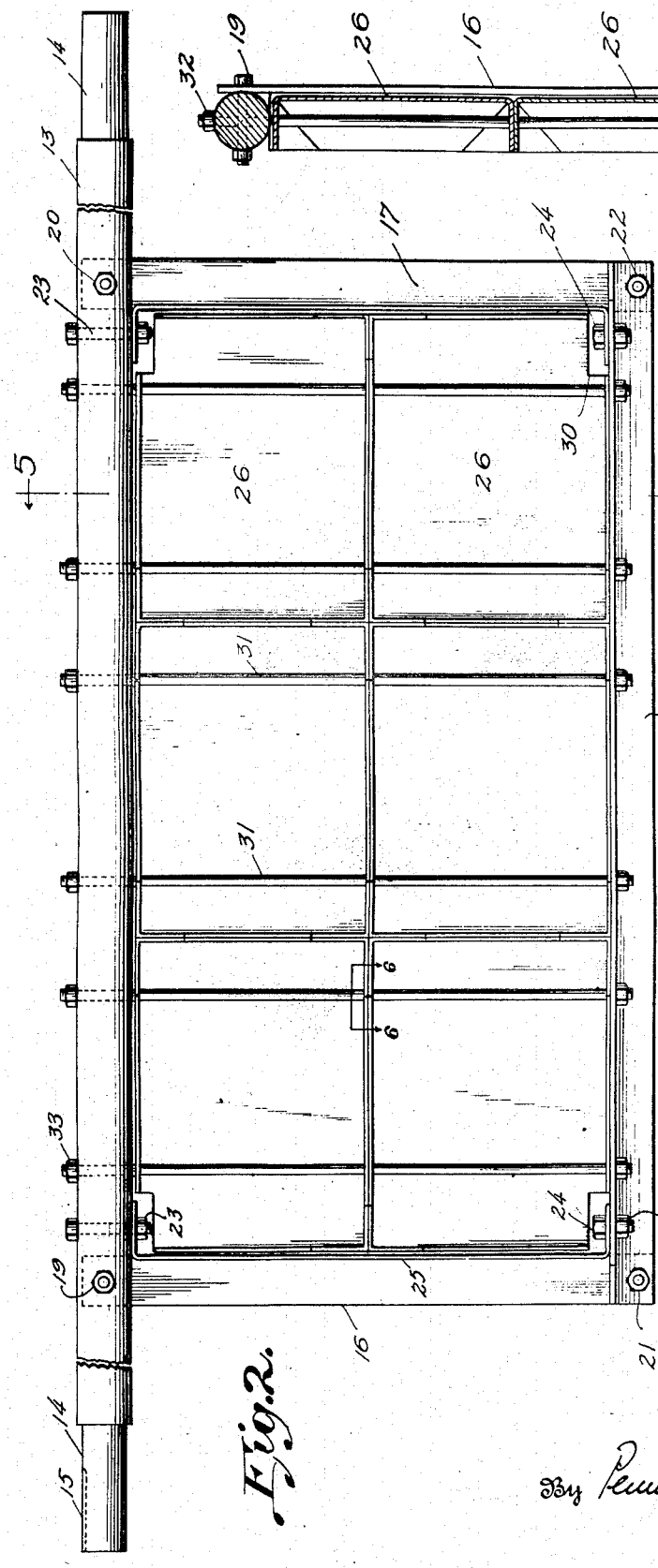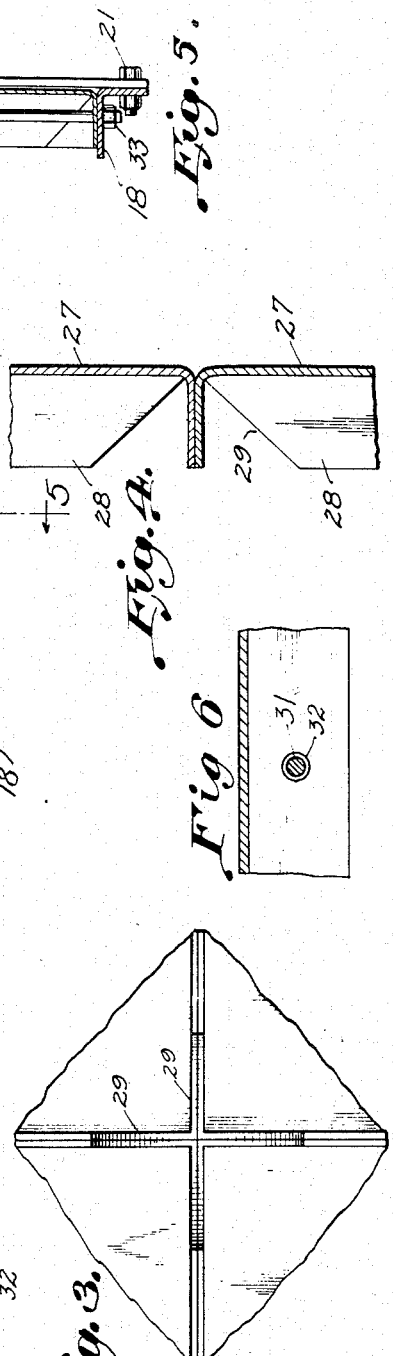

Patented Jan. 21, 1941

2,229,447

UNITED STATES PATENT OFFICE 2,229,447

CLINKER COOLER

Joseph B. Gaffney, Hokendauqua, Pa., assignor to Fuller Company, Catasauqua, Pa., a corporation of Delaware Application May 4, 1940, Serial No. 333,269

10 Claims. (Cl. 34—38)

This invention relates to coolers for sintered or burned materials of the type in which the hot material is supported in the form of a layer and cooled by passage of a gaseous medium therethrough, the medium heated by its contact with the material being then used for various purposes, as for secondary combustion air. More particularly, the invention is concerned with a novel partition or gate for use in such a cooler to subdivide the space above the layer of material so that the gaseous medium which has taken up heat from the layer may be separated into two streams which may be at different temperatures and, therefore, suitable for different uses. The gate of the invention may be installed in apparatus of various types but for purposes of explanation, a form of the gate adapted for use in a cooler for cement clinker constructed under the Douglass Patent No. 2,137,158, issued November 15, 1938, will be illustrated and described in detail.

Coolers for abruptly cooling or chilling cement clinker have recently come into wide use, since such action imparts desirable characteristics to the cement. Such coolers receive the clinker as it issues from the discharge end of the kiln and in the Douglass cooler, the extremely hot clinker is deposited in a layer upon a downwardly inclined grate having alternate movable and stationary grate members through and between which the cooling air flows into and through the layer. The action of the movable members causes the clinker to advance down the grate and at the same time, the clinker is being constantly agitated. The air passing through the layer near the upper end of the grate becomes highly heated and is suitable for use as secondary combustion air in the kiln in which the clinker is produced. The air passing through the layer near the lower end of the grate is also heated but by the time the clinker reaches the lower end of the grate, it has fallen in temperature to such a point that the air used for cooling it is not heated sufficiently to make it useful for combustion purposes in the kiln. It is, therefore, desirable to subdivide the space above the grate into two compartments, so that a supply of intensely heated air may be obtained and kept separate from used cooling air of lower temperature.

A partition or grate may be used for effecting the desired subdivision of the space in the cooler above the grate but the construction of a gate suitable for the purpose presents a serious problem because of the temperatures to which it is exposed. The difficulty arises from the fact that in such a cement cooler, the clinker discharging from the kiln enters the cooler at about 2500° F. and its temperature falls from a brilliant white heat at the point of admission to a dull red or black heat in the vicinity of the gate. In passing through the bed between the gate and point of admission of the clinker, the cooling air is heated to 1000° F. to 1300° F., but the air issuing from the bed in the section beyond the gate rarely has a temperature in excess of 400° F. The gate is thus subjected to widely different temperatures on opposite faces thereof and is exposed to radiant heat from the hot clinker.

Heretofore attempts have been made to maintain gates used in coolers of the type described at a uniform temperature and for this purpose, the gates have been constructed with cooling passageways through which water or air under pressure was caused to flow. Such constructions are expensive and even through a cooling medium is employed, wide temperature differences develop in various parts of the gate with resultant unequal expansion and splitting or cracking of the material. To overcome the difficulty, reinforcements have been applied to the gate at the points most likely to be placed under the greatest stress but such reinforcing has added to the cost and made the gate heavier without substantially increasing its life. The most serious disadvantage of such heavy water or air cooled gates is that damage caused by temperature variations usually results in splitting of the entire gate or breaking it loose from its pivotal support, so that repairs cannot be made by replacement of parts and ordinarily a gate so damaged must be entirely replaced.

The present invention is, accordingly, directed to the provision of a simple light-weight gate which may be used without artificial cooling in a cooler of the type referred to, the gate of the invention being so constructed that it will withstand wide temperature differences in different parts thereof without the development of stresses sufficient to break or otherwise injure it. The new gate comprises a supporting shaft which may be mounted for rocking movement in any suitable manner in the cooler, as in the side wall thereof, and attached to this shaft to depend therefrom is a frame which may be made of metal bars. The width of the gate is slightly less than that of the chamber in which it operates and it is of such length as to be spaced from the material being cooled or to rest in contact therewith, as may be desired. The opening defined by the shaft and frame is substantially closed by a plurality of metal plates which are confined in the plane of the frame and are loosely mounted so that they may expand freely. A considerable number of the plates are employed and their total area is somewhat less than that of the opening in which they are mounted. With this construction, various parts of the gate may expand freely and if any part of the gate becomes damaged, it may be readily replaced at relatively low cost.

For a better understanding of the invention, reference may be made to the accompanying drawings, in which:

Fig. 1 is a view in side elevation and partly in vertical section through a cooler of the Douglass type in which a gate of the invention is installed;

Fig. 2 is a view of the new gate in front elevation;

Fig. 3 is a fragmentary elevational view illustrating portions of adjacent plates;

Fig. 4 is a fragmentary sectional view of portions of a pair of plates; and

Figs. 5 and 6 are sectional views on the lines 5—5 and 6—6, respectively, of Fig. 2.

The cooler illustrated in the drawings includes a hood assembly including a hood 1 and a bustle 2 at the discharge end of a rotary kiln 3, and the clinker discharging from the kiln enters the hood and is directed through a chute not shown into the cooler, generally designated 4. Within the cooler, the material which has descended through the chute, is deposited upon the upper portion of a grate 5 comprising stationary grate members 6 and movable grate members 7. The movable members are reciprocated horizontally by mechanism not illustrated, and this causes the hot material to travel downwardly over the grate in the form of a flat bed of substantially uniform density to the lower end.

The cooling medium employed is air and it is forced upwardly through the grate and the layer of material thereon. The space above the grate is subdivided into a recuperator section 8 and a final cooling section 9 by a gate 10 pivotally supported in the side walls of the cooler. By means of the gate, the air, which has passed through the hotter portion of the bed, is confined to the recuperator section from which it passes upward through chute 2a into bustle 2 from which it passes through the hood and into the kiln where it is used for combustion purposes. The air, which has passed through the lower portion of the bed in the final cooling section and is relatively cool, is drawn off through the stack 11. The material which has travelled the length of the grate is removed by a conveyor, such as a drag chain generally designated 12, and delivered to storage bins or the like.

The new gate, illustrated in detail in Figs. 2 to 6, inclusive, comprises a shaft 13 having trunnions 14 formed at its ends, so that it can be mounted for rocking movement in a suitable support, and at one end, the shaft is provided with a keyway 15 by which the shaft can be connected to means for rocking the gate. Rigidly attached to the shaft between the trunnions and depending from the shaft is a U-shaped frame which comprises flat bars 16, 17 forming end members and an angle member 18 connected to the lower ends thereof and forming the bottom member of the frame. The end members 16, 17 are secured to the shaft by bolts 19 and 20 and to the bottom member by bolts 21 and 22. Attached to the shaft by bolts 23 and to the bottom member by bolts 24 are flat plate members 25, these members having end portions lying parallel to the shaft and bottom member and central portions lying at right angles to the plane of the end members 16, 17 and along the inner edges thereof.

Mounted in the frame thus formed are plates 26, each of which has a flat central portion 27 square in shape and is provided with peripheral flanges cut away at the corners, as indicated at 29. Certain of the plates also have cutouts 30 in their corners to provide space for the heads of bolts 23 and 24. In the gate illustrated, there are six such plates, but any desired number may be employed, plates of small size being preferred, so that if one plate becomes damaged, it can be replaced at low cost.

The plates are arranged in upper and lower rows with three plates in each row in the construction shown, and the plates in the lower row lie with their bottom flanges resting on the bottom member 18. The plates are held in position by means of rods 31 which pass through openings 32 in the upper and lower flanges of each plate, the rods also passing through the shaft and the bottom member and being held in position by nuts 33 on their ends. The openings through the flanges for the rods are of substantially greater diameter than the rods and the total area of the group of plates is somewhat less than that of the opening defined by the frame. The plates may thus expand freely and also shift slightly in the frame without binding. The frame members and plates are preferably made of a suitable heat resisting metal, such as one of the chrome-nickel-steel alloys available for high temperature use.

The new gate is highly effective for its intended purpose and because of the permissible expansion and shifting of the parts, it is not subject to warping and cracking, even though exposed to widely differing temperatures on different parts thereof. Also, it is light in weight and readily assembled and taken apart, so that if repairs are needed at any time, they can be made quickly and at low cost.

I claim:

1. In a cooler for sintered, burned, and similar hot materials which includes a pervious support for a bed of the materials and means for passing a cooling medium therethrough to take up heat therefrom, a gate for subdividing the space above the support into a pair of compartments comprising a frame, a shaft on which the frame is mounted to hang therefrom, the shaft having end portions projecting beyond the opposite ends of the frame, and a plurality of plates mounted loosely in the frame and forming a wall defined by the frame.

2. In a cooler for sintered, burned, and similar hot materials which includes a pervious support for a bed of the materials and means for passing a cooling medium therethrough to take up heat therefrom, a gate for subdividing the space above the support into a pair of compartments comprising a frame, a shaft on which the frame is mounted to hang therefrom, the shaft having end portions projecting beyond the opposite ends of the frame, a plurality of plates mounted in the frame to close the opening defined by the frame, and means securing the plates in place in the frame while permitting expansion of the plates.

3. In a cooler for sintered, burned, and similar hot materials which includes a pervious support for a bed of the materials and means for passing a cooling medium therethrough to take up heat therefrom, a gate for subdividing the space above the support into a pair of compartments comprising a frame, a shaft on which the frame is mounted to hang therefrom, the shaft having end portions projecting beyond the opposite ends of the frame, and a plurality of plates mounted loosely in the frame in at least two rows one above the other, the plates in the lower row supporting those in the upper and the group of plates substantially closing the opening defined by the frame.

4. In a cooler for sintered, burned, and similar hot materials which includes a pervious support for a bed of the materials, means for advancing the materials along the support, and means for passing a cooling medium through the bed to take up heat therefrom, a gate for subdividing the space above the support into a pair of compartments comprising a shaft, a frame secured to the shaft inward from the ends thereof and depending from the shaft in normal operation, a plurality of plates carried by the frame and substantially closing the opening defined by the frame, and means extending across the frame and holding the plates in position while permitting expansion of the plates.

5. In a cooler for sintered, burned, and similar hot materials which includes a pervious support for a bed of the materials, means for advancing the materials along the support, and means for passing a cooling medium through the bed to take up heat therefrom, a gate for subdividing the space above the support into a pair of compartments comprising a shaft, a frame secured to the shaft inward from the ends thereof and depending from the shaft in normal operation, a plurality of plates carried by the frame and substantially closing the opening defined by the frame, and rods extending across the frame and passing loosely through portions of the plates to hold them in position.

6. In a cooler for sintered, burned, and similar hot materials which includes a pervious support for a bed of the materials, means for advancing the materials along the support, and means for passing a cooling medium through the bed to take up heat therefrom, a gate for subdividing the space above the support into a pair of compartments comprising a shaft, a frame secured to the shaft inward from the ends thereof and depending from the shaft in normal operation, a plurality of plates carried by the frame and arranged in at least two rows, one above the other, the plates having peripheral flanges and the plates in the upper row resting on those beneath, and members extending across the frame and passing loosely through openings in the flanges for holding the plates in position.

7. In a cooler for sintered, burned, and similar hot materials which includes a pervious support for a bed of the materials, means for advancing the materials along the support, and means for passing a cooling medium through the bed to take up heat therefrom, a gate for subdividing the space above the support into a pair of compartments comprising a shaft, a U-shaped frame having end members connected to the shaft and a bottom member connecting the end members, a plurality of plates supported by the bottom member and together substantially closing the opening defined by the shaft and frame, and means for holding the plates in position in the frame while permitting them to expand.

8. In a cooler for sintered, burned, and similar hot materials which includes a pervious support for a bed of the materials, means for advancing the materials along the support, and means for passing a cooling medium through the bed to take up heat therefrom, a gate for subdividing the space above the support into a pair of compartments comprising a shaft, a U-shaped frame having end members connected to the shaft and a bottom member connecting the end members, a plurality of plates supported by the bottom member, the plates having peripheral flanges and being arranged in at least two rows one above the other, the upper plates resting on those beneath and the plates having a total area slightly less than the opening defined by the shaft and frame, and rods secured to the shaft and the bottom member of the frame and passing loosely through openings in the flanges of the plates to hold them in position.

9. In a cooler for sintered, burned, and similar hot materials which includes a pervious support for a bed of the materials, means for advancing the materials along the support, and means for passing a cooling medium through the bed to take up heat therefrom, a gate for subdividing the space above the support into a pair of compartments comprising a shaft mounted in the cooler for rocking movement, a frame secured to the shaft inward from the ends thereof and depending from the shaft, a plurality of plates mounted loosely in the frame for free expansion and together substantially closing the opening defined by the shaft and frame, and means for holding the plates in the plane of the frame.

10. A gate for use in a cooler for hot materials in which a cooler medium is passed through a layer of the materials and takes up heat therefrom, the gate subdividing the stream of the used medium and comprising a shaft, a frame secured to the shaft to depend therefrom between its ends, a plurality of plates supported by the frame, said plates substantially closing the opening defined by the frame and shaft, and means holding the plates in the plane of the frame while permitting their free expansion.

JOSEPH B. GAFFNEY.